(12) United States Patent
Wada et al.

(10) Patent No.: US 11,014,844 B2
(45) Date of Patent: May 25, 2021

(54) SLEEVE FOR GLASS TUBE MOLDING, AND METHOD FOR ASSEMBLING SLEEVE FOR GLASS TUBE MOLDING

(71) Applicant: NIPPON ELECTRIC GLASS CO., LTD., Otsu (JP)

(72) Inventors: Masanori Wada, Otsu (JP); Kenichi Hoshiba, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 335 days.

(21) Appl. No.: 15/750,646

(22) PCT Filed: May 13, 2016

(86) PCT No.: PCT/JP2016/064290
§ 371 (c)(1),
(2) Date: Feb. 6, 2018

(87) PCT Pub. No.: WO2017/022294
PCT Pub. Date: Feb. 9, 2017

(65) Prior Publication Data
US 2020/0079675 A1  Mar. 12, 2020

(30) Foreign Application Priority Data

Aug. 6, 2015 (JP) .............................. JP2015-156524

(51) Int. Cl.
*C03B 17/04* (2006.01)
(52) U.S. Cl.
CPC .................... *C03B 17/04* (2013.01)
(58) Field of Classification Search
CPC .................................................. C03B 17/04
See application file for complete search history.

(56) References Cited

U.S. PATENT DOCUMENTS 1,766,638 A   6/1930 Howard
2,464,028 A * 3/1949 Danner .................. C03B 17/04
                                                   65/187
(Continued)

FOREIGN PATENT DOCUMENTS

CN   101678193 A    3/2010
DE   10230496 C1    9/2003
(Continued)

OTHER PUBLICATIONS

International Search Report corresponding to Application No. PCT/JP2016/064290; dated Aug. 9, 2016.
(Continued)

*Primary Examiner* — Queenie S Dehghan
(74) *Attorney, Agent, or Firm* — Cantor Colburn LLP

(57) ABSTRACT

This sleeve for glass tube molding is provided with: a sleeve shaft; a refractory tube into which the sleeve shaft is inserted in a coaxial manner; and a metal tip that is fixed to the tip of the sleeve shaft, and regulates movement of the refractory tube in the axial direction and towards the tip. The sleeve for glass tube molding is capable of ensuring the coaxiality of the metal tip and the refractory tube on the sleeve shaft. The metal tip comprises: an annular collar member that has a tapered outer circumferential surface of which the cross-sectional area gradually increases towards the tip of the sleeve shaft, and that is coaxially fitted to the tip of the sleeve shaft; and a main body member that has a tapered outer circumferential through-hole of which the cross-sectional area gradually increases towards the tip so as to conform to the outer circumferential surface of the collar member, and that is fitted to the collar member via the through-hole.

4 Claims, 4 Drawing Sheets

(56) References Cited

U.S. PATENT DOCUMENTS

| | | | |
|---|---|---|---|
| 3,364,004 A * | 1/1968 | Cozine | C03B 17/04 65/187 |
| 8,491,568 B2 | 7/2013 | Schertiger et al. | |
| 9,259,551 B2 | 2/2016 | Schertiger et al. | |
| 2010/0211049 A1 | 8/2010 | Schertiger et al. | |
| 2013/0289537 A1 | 10/2013 | Schertiger et al. | |

FOREIGN PATENT DOCUMENTS

| | | |
|---|---|---|
| DE | 19921290 B4 | 5/2004 |
| JP | S3925566 A | 11/1964 |
| JP | S3925566 B1 | 11/1964 |
| JP | S39025566 B1 | 11/1964 |
| JP | S4029817 A | 10/1965 |
| JP | S4029817 Y1 | 10/1965 |
| JP | S40029817 Y1 | 10/1965 |
| JP | S47041723 B | 10/1972 |
| JP | S62166225 U1 | 10/1987 |
| JP | H01129232 U1 | 9/1989 |
| JP | H05294651 A | 11/1993 |

OTHER PUBLICATIONS

International Preliminary Report on Patentability and Written Opinion of the International Searching Authority corresponding to Application No. PCT/JP2016/064290; dated Feb. 8, 2018.

International Preliminary Report on Patentability and Written Opinion of the International Searching Authority corresponding to Application No. PCT/JP2016/064290; dated Feb. 6, 2018.

CNIPO Office Action corresponding to Application No. 201680045067.4; dated Nov. 4, 2019.

IPI Office Action for corresponding IN Application No. 201847007701, dated Jul. 15, 2020, with partial translation within document.

* cited by examiner

SLEEVE FOR GLASS TUBE MOLDING, AND METHOD FOR ASSEMBLING SLEEVE FOR GLASS TUBE MOLDING

CROSS REFERENCE TO RELATED APPLICATIONS

The present U.S. patent application is a U.S. National Phase Application under 35 USC 371 of International Application PCT/JP2016/064290, filed on May 13, 2016. Priority under 35 U.S.C § 119(a) and 35 U.S.C. § 365(b) is claimed from Japanese Application No. 2015-156524 filed on Aug. 6, 2015, the entirety of which is incorporated herein by references.

TECHNICAL FIELD

The present invention relates to a technique about a sleeve for glass tube molding and a method for assembling the sleeve, more specifically a technique about a metal tip mounted on the downstream-side tip of a refractory tube that guides, toward the downstream side, molten glass wrapped around its outer circumferential surface.

BACKGROUND ART

Conventionally, the Danner process has been widely used as a method for mass-producing glass tubes and glass rods.

In the Danner process, glass tubes or glass rods are continuously shaped by letting molten glass flow on a sleeve that is supported with its tip inclining downward and is drivingly rotated about its axis, wrapping the flowing molten glass around the outer circumferential surface of the sleeve, and drawing the molten glass while blowing (or without blowing) air from the tip of the sleeve.

The sleeve used in the above Danner process includes, as main components, a sleeve shaft pivotally supported with its tip inclining downward and members into which the sleeve shaft is inserted in order in a coaxial manner, such as a metal tip, a refractory tube, and a metal holding fixture (for example, see "Patent Literature 1").

The metal tip is fixed to the tip of the sleeve shaft, and the metal holding fixture is disposed slidably along the axial direction and constantly urged toward the tip of the sleeve shaft by an urging member.

Hence, the refractory tube is constantly clamped between the metal tip and the metal holding fixture by the urging force of the urging member.

Accordingly, the arrangement posture of the metal tip, the refractory tube, and the metal holding fixture is firmly held, resulting in a structure that hardly cause large runout relative to the sleeve shaft that is drivingly rotated. Unevenness in the thickness of the molten glass drawn from the tip of the sleeve can be thus suppressed, and high-quality glass tubes or glass rods with a high dimensional accuracy can be continuously formed.

CITATION LIST

Patent Literature

PTL 1: Japanese Unexamined Patent Application Publication No. 1993-294651

SUMMARY OF INVENTION

Technical Problem

In a conventional sleeve, an external thread is formed on the tip of a sleeve shaft, and an internal thread is formed on the inner circumferential surface of a metal tip. The tip of the sleeve shaft is screwed into the metal tip using the external thread and the internal thread.

The number of crests of the external thread of the sleeve shaft screwed with the internal thread of the metal tip varies according to the phase in the circumferential direction of the internal thread.

The tip of the sleeve shaft has a position where more crests are engaged (the number of screwed crests of the external thread is larger) and a position where fewer crests are engaged (the number of screwed crests of the external thread is smaller), and the load applied on the tip through the metal tip varies depending on the location.

Accordingly, the tip of the sleeve shaft is easily twisted, which increases the possibility of deviations from coaxiality, on the sleeve shaft, of the metal tip and the refractory tube. It is thus difficult to suppress unevenness in the thickness of the molten glass drawn from the tip of the sleeve and to continuously form high-quality glass tubes or glass rods with a high dimensional accuracy.

The present invention has been made in view of the current problems above and has an object to provide a sleeve for glass tube molding including: a sleeve shaft; a refractory tube into which the sleeve shaft is inserted in a coaxial manner; and a metal tip secured to the tip of the sleeve shaft and configured to regulate movement of the refractory tube in the axial direction and toward the tip side, the sleeve for glass tube molding being capable of ensuring the coaxiality, on the sleeve shaft, of the metal tip and the refractory tube.

Solution to Problem

The problem to be solved by the present invention is as described above, and a solution to the above problem will be described next.

That is, a sleeve for glass tube molding according to the present invention includes: a sleeve shaft; a refractory tube into which the sleeve shaft is inserted in a coaxial manner; and a metal tip secured to a tip of the sleeve shaft and configured to regulate movement of the refractory tube in an axial direction and toward a tip side, the metal tip including: an annular collar member having a tapered outer circumferential surface a cross-sectional area of which increases in diameter toward the tip side, and being coaxially fitted to the tip of the sleeve shaft; and a main body member having a tapered through-hole a cross-sectional area of which increases in diameter toward the tip side so as to conform to the outer circumferential surface of the collar member, and being fitted to the collar member via the through-hole.

As described above, in the sleeve for glass tube molding according to the present invention, the entire outer circumferential surface of the collar member fixed to the tip of the sleeve shaft is in close contact with the inner circumferential surface of the through-hole of the main body member, and thus, for example, the tensile load in the axial direction applied on the tip of the sleeve shaft through the metal tip when the molten glass is drawn is equally applied on every arbitrary position.

Accordingly, the metal tip according to the present invention suppresses twisting of the tip of the sleeve shaft due to long term use of the sleeve for glass tube molding and ensures coaxiality, on the sleeve shaft, of the metal tip and the refractory tube.

In the sleeve for glass tube molding according to the present invention, the collar member may preferably have a halved structure divided into two parts in a radial direction.

In the sleeve for glass tube molding having the above structure, it is easy to fit the collar member to the tip of the sleeve shaft by clamping the tip between the two parts of the collar member.

A method for assembling a glass tube sleeve according to the present invention is a method for assembling a sleeve for glass tube molding, the sleeve including a sleeve shaft and a metal tip secured to a tip of the sleeve shaft, the metal tip including: an annular collar member having a tapered outer circumferential surface a cross-sectional area of which increases in diameter toward a tip side, and being coaxially fitted to the tip of the sleeve shaft; and a main body member having a tapered through-hole a cross-sectional area of which increases in diameter toward the tip side so as to conform to the outer circumferential surface of the collar member, and being fitted to the collar member via the through-hole, includes inserting the sleeve shaft into the main body member such that the main body member is out of, to a base side, a position on the sleeve shaft at which the collar member is to be fitted; fitting the collar member to the tip of the sleeve shaft; and moving the main body member toward the tip side to fit the main body member to the collar member to assemble the metal tip to the tip of the sleeve shaft.

As described above, in the method for assembling a sleeve for glass tube molding according to the present invention, the entire outer circumferential surface of the collar member fixed to the tip of the sleeve shaft is in close contact with the inner circumferential surface of the through-hole of the main body member, and thus, for example, the tensile load in the axial direction applied on the tip of the sleeve shaft through the metal tip when the molten glass is drawn is equally applied on every arbitrary position.

Accordingly, the metal tip according to the present invention suppresses twisting of the tip of the sleeve shaft due to long term use of the sleeve for glass tube molding and ensures coaxiality, on the sleeve shaft, of the metal tip, the refractory tube, and the metal holding fixture.

Advantageous Effects of Invention

Advantageous effects of the present invention are as follows.

That is, in the sleeve for glass tube molding and the method for assembling a sleeve for glass tube molding according to the present invention, coaxiality, on the sleeve shaft, of the metal tip and the refractory tube is ensured.

BRIEF DESCRIPTION OF DRAWINGS

FIG. 3A is a sectional side view for illustrating insertion of the sleeve shaft into a main body member, FIG. 3B is a sectional side view for illustrating mounting of a collar member on the sleeve shaft, FIG. 3C is a sectional side view for illustrating pressing of the main body member toward the collar member with a refractory tube, and FIG. 3D is a sectional side view of a state immediately after the metal tip has been assembled to the sleeve shaft.

DESCRIPTION OF EMBODIMENTS

Figure 1:
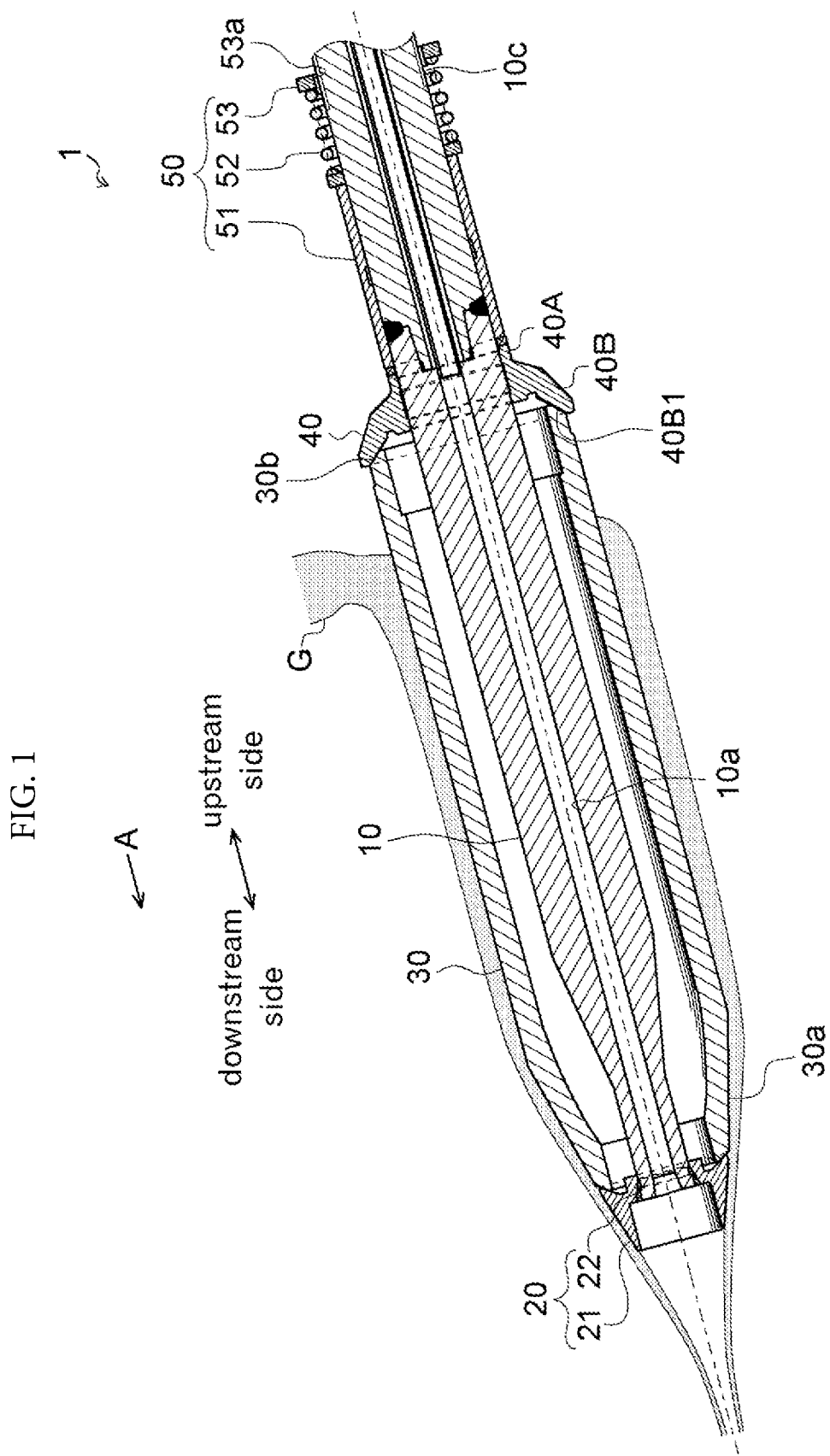
FIG. 1 is a sectional side view for illustrating the general arrangement of a sleeve for glass tube molding according to an embodiment of the present invention.

Subsequently, an embodiment of the present invention will be described referring to FIG. 1 to FIG. 4.

In the descriptions below, the direction of the arrow A in FIG. 1 to FIG. 4 is assumed to be the drawing direction (conveying direction) of molten glass G for convenience.

Also, in the descriptions below, the vertical direction in FIG. 1 to FIG. 4 is assumed to be the vertical direction of a sleeve 1 or 101 for glass tube molding for convenience.

[Sleeve 1 for Glass Tube Molding]

The general arrangement of the sleeve 1 for glass tube molding (hereinafter simply referred to as the "sleeve 1") embodying the present invention is first described referring to FIG. 1.

The sleeve 1 in the present embodiment is used for, for example, mass-producing glass tubes and glass rods by the Danner process.

The sleeve 1 includes a sleeve shaft 10, a metal tip 20, a refractory tube 30, the metal holding fixture 40, and an urging mechanism 50 as main components.

The sleeve shaft 10 is the base of the sleeve 1.

The sleeve shaft 10 includes a long round bar member made of, for example, a heat resisting steel such as Fe—Co—Ni alloys and Fe—Cr—Ni alloys, and a through-hole 10a is formed inside the sleeve shaft 10 in a coaxial manner.

The sleeve shaft 10 is arranged such that its one end (end on the drawing direction side (the side in the direction of the arrow A in FIG. 1) of the molten glass G) inclines downward, and the other end is detachably supported by a rotational driving device (not illustrated).

The through-hole 10a of the sleeve shaft 10 communicates with an air supplying device (not illustrated) at the other end via a piping member or the like.

Subsequently, the metal tip 20 will be described.

The metal tip 20 is a metal tip according to an embodiment constituting the tip of the sleeve 1. The metal tip 20 and the metal holding fixture 40 described later clamp and hold the refractory tube 30.

As described later in detail, the metal tip 20 includes a main body member 21 and a collar member 22 used for fixing the main body member 21 to the sleeve shaft 10.

The main body member 21 is formed into a truncated cone shape and is disposed at the tip of the sleeve shaft 10 coaxially with the sleeve shaft 10. The cross-sectional area of the main body member 21 gradually becomes smaller in diameter toward the drawing side (hereinafter referred to as the "downstream side") of the molten glass G.

The collar member 22 is formed into an annular shape and is disposed at the tip (downstream-side end) of the sleeve shaft 10 coaxially with the sleeve shaft 10.

The main body member 21 is held with the collar member 22 therebetween while movement of the main body member 21 along the axial direction is regulated.

Accordingly, the metal tip 20 is fixed to the tip of the sleeve shaft 10.

Subsequently, the refractory tube 30 will be described.

The molten glass G guided onto the sleeve 1 is wrapped around the outer circumferential surface of the refractory tube 30 and is gradually conveyed toward the downstream side.

The refractory tube 30 includes a long, hollow round bar member made of, for example, a silica-alumina or silica-alumina-zirconia refractory, and a tapered portion 30a the cross-sectional area of which gradually becomes smaller in diameter is formed at one end of the refractory tube 30.

The outer circumferential surface of the refractory tube 30 is covered with, for example, a platinum or platinum-alloy film having a thickness of 250 [μm] to 450 [μm].

On the side (hereinafter referred to as the "upstream side") opposite to the downstream side of the metal tip 20, the sleeve shaft 10 is inserted into the refractory tube 30 in a coaxial manner with the tapered portion 30a oriented toward the downstream side.

Accordingly, the metal tip 20 is arranged on the downstream side of the refractory tube 30, and the tapered portion 30a of the refractory tube 30 is smoothly connected with the tapered shape of the outer circumferential surface of the metal tip 20 (more specifically, the main body member 21) at the downstream-side end of the sleeve 1 as a whole.

The metal tip 20 regulates movement of the refractory tube 30 in the axial direction toward the downstream side (tip side of the sleeve shaft 10).

Subsequently, the metal holding fixture 40 will be described.

The metal holding fixture 40 clamps and holds the refractory tube 30 together with the metal tip 20.

The metal holding fixture 40 is made of, for example, a heat resisting steel such as Fe—Co—Ni alloys and Fe—Cr—Ni alloys and includes, as main components, a hollow cylindrical main body portion 40A and a flange portion 40B disposed at one end of the outer circumferential surface of the main body portion 40A.

On the upstream side of the refractory tube 30, the sleeve shaft 10 is slidably inserted into the main body portion 40A of the metal holding fixture 40 in a coaxial manner with the flange portion 40B oriented toward the downstream side (refractory tube 30 side).

The edge portion of the downstream-side end surface of the flange portion 40B has a depressed portion 40B1 formed into a tapered shape the cross-sectional shape of which gradually becomes smaller in diameter toward the upstream side in the axial direction.

On the other hand, the upstream-side (metal holding fixture 40 side) end surface of the refractory tube 30 has an edge portion 30b formed into a tapered shape the cross-sectional shape of which gradually becomes smaller in diameter toward the upstream side in the axial direction.

The tapered depressed portion 40B1 of the metal holding fixture 40 has contact with the tapered edge portion 30b of the refractory tube 30 in a coaxial manner.

Accordingly, the metal holding fixture 40 regulates decentering at the upstream-side end of the refractory tube 30.

Subsequently, the urging mechanism 50 will be described.

The urging mechanism 50 urges the metal holding fixture 40 toward the downstream side along the axial direction.

The urging mechanism 50 includes, for example, a contact member 51, an urging member 52, and an adjusting nut 53.

The contact member 51 has direct contact with the metal holding fixture 40.

The contact member 51 is made of a hollow cylindrical member, and its inside diameter is somewhat larger than the outside diameter of the sleeve shaft 10.

On the upstream side of the metal holding fixture 40, the contact member 51 is arranged coaxially with the sleeve shaft 10 and slidably along the axial direction.

The structure of the contact member 51 is not limited to the present embodiment. For example, a structure without the contact member 51 (in other words, the metal holding fixture 40 and the contact member 51 are integrally formed) may be made by extending the upstream-side end of the metal holding fixture 40 along the axial direction.

The urging member 52 urges the contact member 51 toward the downstream side (metal holding fixture 40 side).

The urging member 52 includes, for example, a known compression spring.

The urging member 52 is arranged between the contact member 51 and the adjusting nut 53 coaxially with the sleeve shaft 10. Movement of the end of the urging member 52 on the adjusting nut 53 side toward the upstream side is regulated.

The urging member 52 thus urges the contact member 51 toward the downstream side.

The adjusting nut 53 is used for adjusting the urging force of the urging member 52.

The adjusting nut 53 is made of an annular member having an internal thread 53a formed on its inner circumferential surface.

The outer circumferential surface of the sleeve shaft 10 has an external thread 10c formed on its upstream-side end above the urging member 52.

The sleeve shaft 10 is screwed into the adjusting nut 53 on the upstream side of the urging member 52 using the external thread 10c and the internal thread 53a.

This structure enables the arrangement position of the adjusting nut 53 to be minutely moved along the axial direction.

Accordingly, the dimension of the gap between the contact member 51 and the adjusting nut 53, that is, the total length of the urging member 52, can be minutely changed, thereby enabling fine adjustments of the urging force of the urging member 52.

As described above, the sleeve 1 in the present embodiment includes the sleeve shaft 10 and members disposed on the sleeve shaft 10 in the order from the downstream side to the upstream side in a coaxial manner, such as the metal tip 20, the refractory tube 30, the metal holding fixture 40, and the urging mechanism 50.

The metal tip 20 is fixed to the tip of the sleeve shaft 10. The metal holding fixture 40 is disposed slidably along the axial direction and constantly urged toward the tip of the sleeve shaft 10 by the urging mechanism 50.

Hence, the refractory tube 30 is constantly clamped between the metal tip 20 and the metal holding fixture 40 by the urging force of the urging mechanism 50.

Accordingly, the arrangement posture of each of the metal tip 20, the refractory tube 30, and the metal holding fixture 40 is firmly held, and large runout relative to the sleeve shaft that is drivingly rotated is hardly caused.

Glass tubes or glass rods are continuously shaped by drivingly rotating the sleeve 1 having the above structure about the axis, letting the molten glass G flow on the drivingly rotated sleeve 1 (more specifically, on the refractory tube 30), wrapping the flowing molten glass G around the outer circumferential surface of the sleeve 1, and drawing the molten glass G while blowing air from the tip of the sleeve 1 (more specifically, from a depressed portion 21a of the metal tip 20 described later).

[Metal Tip 20]

Subsequently, the structure of the metal tip 20 will be described in detail referring to FIG. 2 and FIG. 4.

As described above, the metal tip 20 includes the main body member 21 and the collar member 22 as main components.

Figure 2:
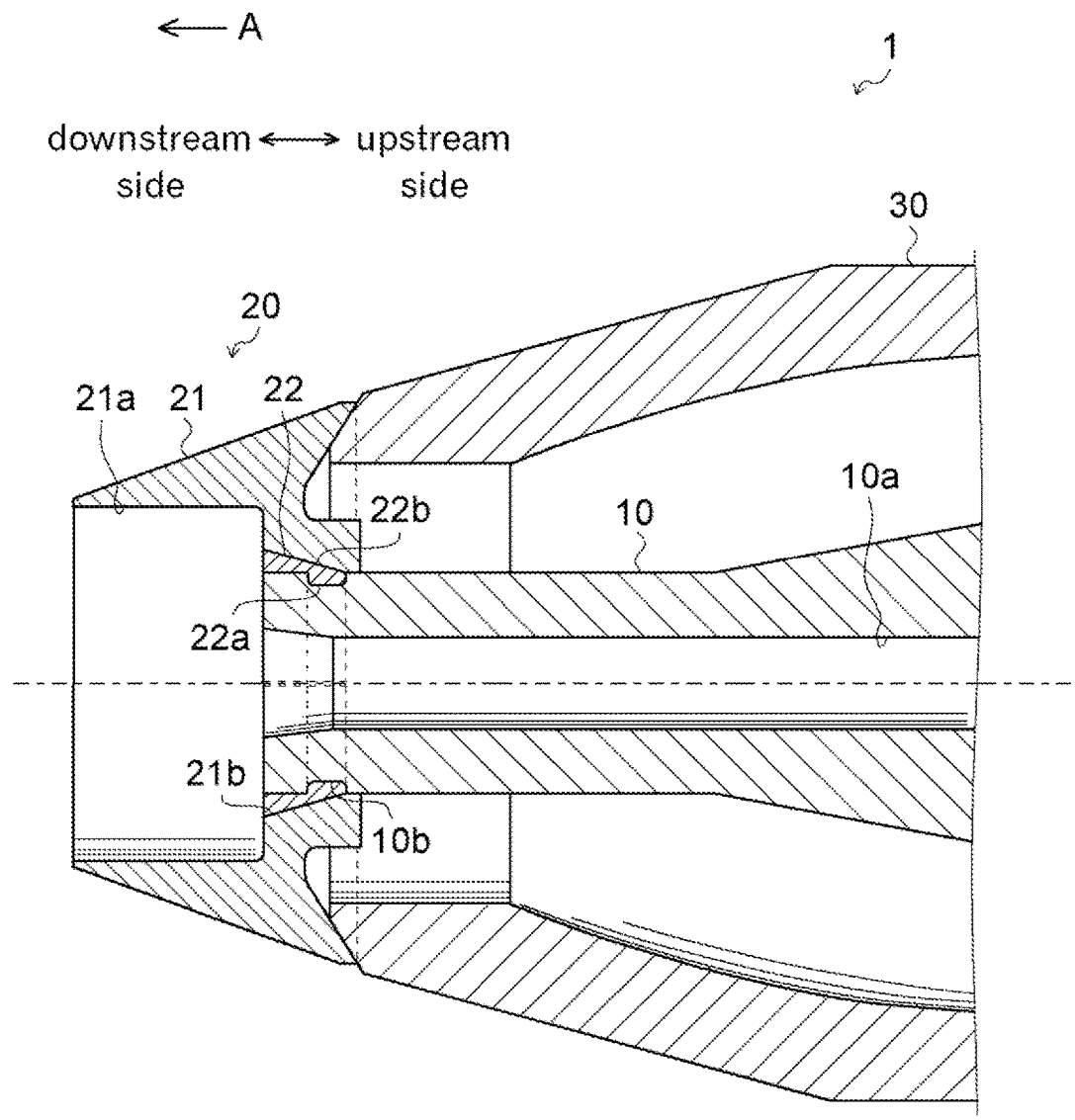
FIG. 2 is an enlarged sectional side view of a metal tip and its vicinities in the sleeve for glass tube molding.

As shown in FIG. 2, the main body member 21 includes a truncated-cone-shaped member made of, for example, a heat resisting steel such as Fe—Co—Ni alloys and Fe—

Cr—Ni alloys and is disposed at the tip of the sleeve shaft 10 coaxially with the sleeve shaft 10 as described above. The cross-sectional area of the main body member 21 gradually becomes smaller in diameter toward the downstream side.

The outer circumferential surface of the main body member 21 is covered with, for example, a platinum or platinum-alloy film having a thickness of 250 [μm] to 450 [μm].

At the downstream-side end of the main body member 21, the depressed portion 21a having a circular cross-sectional shape is formed in a coaxial manner.

On the upstream-side end surface (bottom surface of the depressed portion 21a) of the depressed portion 21a, a through-hole 21b is formed in a coaxial manner.

The through-hole 21b is formed into a tapered shape the cross-sectional shape of which gradually becomes larger in diameter toward the downstream side (tip side of the sleeve shaft 10).

The collar member 22 includes an annular member made of, for example, a heat resisting steel such as Fe—Co—Ni alloys and Fe—Cr—Ni alloys and is disposed at the tip of the sleeve shaft 10 coaxially with the sleeve shaft 10 as described above.

The collar member 22 has a halved structure divided into two parts in the radial direction, and one end (upstream-side end) of the inner circumferential surface of the collar member 22 has an annular projecting portion 22a formed in a coaxial manner.

An annular depressed portion 10b is formed on the outer circumferential surface of the tip of the sleeve shaft 10 in a coaxial manner.

By fitting the projecting portion 22a of the collar member 22 into the depressed portion 10b of the sleeve shaft 10, movement of the collar member 22 along the axial direction is regulated, and the collar member 22 is fitted to the sleeve shaft 10.

An outer circumferential surface 22b of the collar member 22 is formed into a tapered shape the cross-sectional area of which gradually becomes larger in diameter toward the downstream side (tip side of the sleeve shaft 10) so as to conform to the tapered shape of the through-hole 21b of the main body member 21.

The main body member 21 is held at the tip (downstream-side end) of the sleeve shaft 10 with the collar member 22 having the above structure disposed therebetween.

Specifically, by fitting the through-hole 21b of the main body member 21 with the outer circumferential surface 22b of the collar member 22, movement of the main body member 21 toward the downstream side along the axial direction is regulated, and the main body member 21 is held by the sleeve shaft 10.

In other words, the metal tip 20 is fixed to the tip (downstream-side end) of the sleeve shaft 10.

As described above, since the metal tip 20 in the present embodiment differs from a conventional metal tip 120 (see FIG. 4) into which the sleeve shaft 10 is screwed, the load applied on the sleeve shaft 10 through the metal tip 20 is uniform across all phases in the circumferential direction, and twisting of the tip of the sleeve shaft 10 is suppressed.

Figure 4:
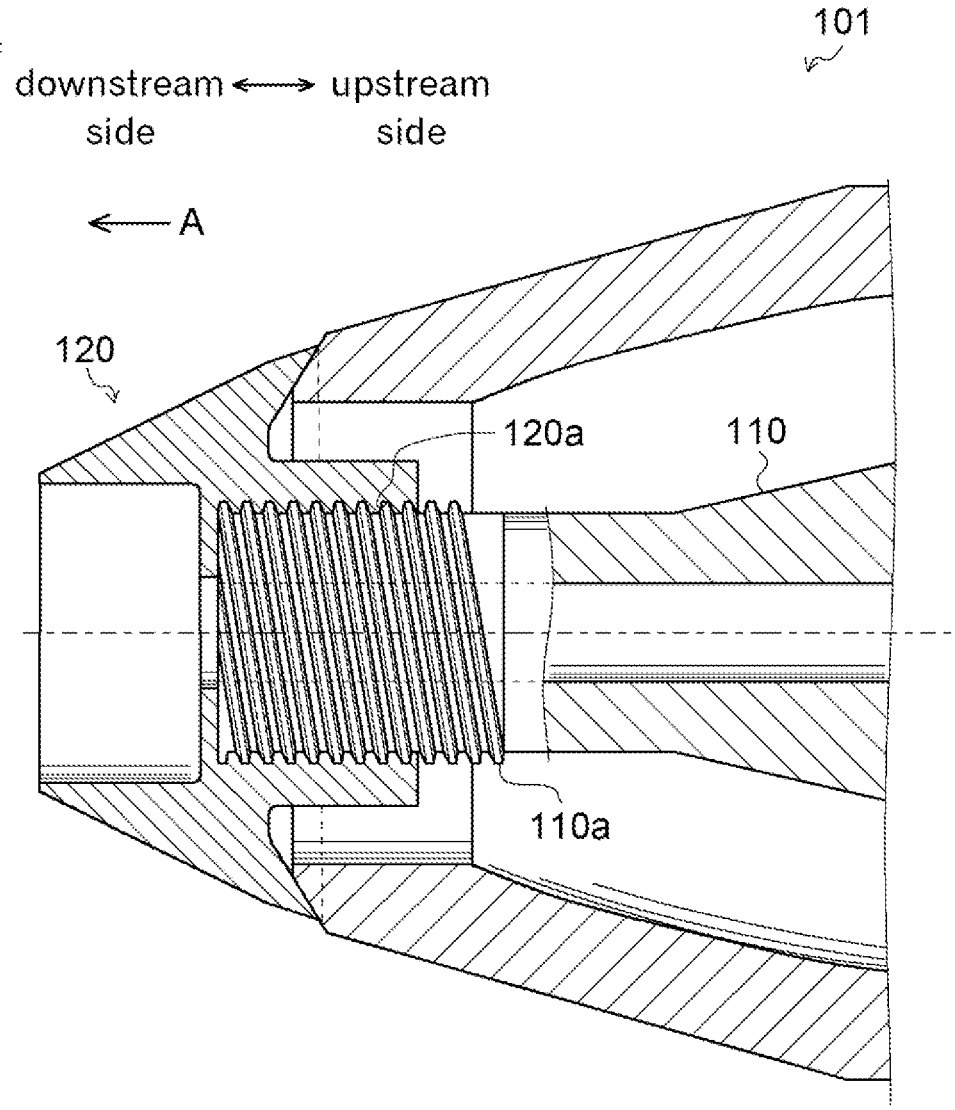
FIG. 4 is an enlarged sectional side view of a metal tip and its vicinities in a conventional sleeve for glass tube molding.

Specifically, as shown in FIG. 4, an internal thread 120a is formed in a coaxial manner in the conventional metal tip 120. Also, an external thread 110a is formed on the tip of a sleeve shaft 110.

The tip of the sleeve shaft 110 is screwed into the metal tip 120 in a coaxial manner using the external thread 110a and the internal thread 120a.

The number of crests of the external thread 110a of the sleeve shaft 110 screwed with the internal thread 120a of the metal tip 120 may vary according to the phase in the circumferential direction of the internal thread 120a.

For example, regarding the internal thread 120a of the metal tip 120 in FIG. 4, nine crests of the external thread 110a are screwed with the upper end side of the internal thread 120a, and eight crests of the external thread 110a are screwed with the opposite lower end side (position out of phase with the upper end side by 180°).

In other words, the number of engaged crests of the external thread 110a is larger (the number of screwed crests of the external thread 110a is larger by one) on the upper end side of the internal thread 120a than on the lower end side.

In the conventional sleeve 101 for glass tube molding (hereinafter simply referred to as the "sleeve 101") having the above structure, when the molten glass G (see FIG. 1) is drawn, the tensile load in the axial direction applied on the tip of the sleeve shaft 110 through the metal tip 120 is larger at the position where more crests are engaged than at the position where fewer crests are engaged, and the former tends to be constantly stretched more tightly than the latter. Twisting of the tip of the sleeve shaft 110 is easily caused by long term use of the sleeve 101.

On the other hand, in the present embodiment, the entire outer circumferential surface 22b of the collar member 22 fixed to the tip of the sleeve shaft 10 is in close contact with the inner circumferential surface of the through-hole 21b of the main body member 21 as shown in FIG. 2, and thus the tensile load in the axial direction applied on the tip of the sleeve shaft 10 through the metal tip 20 when the molten glass G is drawn is equally applied on every arbitrary position.

Accordingly, the metal tip 20 in the present embodiment suppresses twisting of the tip of the sleeve shaft 10 due to long term use of the sleeve 1.

[Assembling Procedure of Metal Tip 20]

Subsequently, an assembling procedure of the metal tip 20 will be described referring to FIGS. 3A-3D.

At first, the sleeve shaft 10 has already been inserted into the refractory tube 30, the metal holding fixture 40, and the urging mechanism 50 (see FIG. 1).

The coaxiality of the refractory tube 30, the metal holding fixture 40, and the urging mechanism 50 has not been adjusted yet, and the arrangement position of the refractory tube 30 is out of a predetermined position to the upstream side.

Figure 3A:
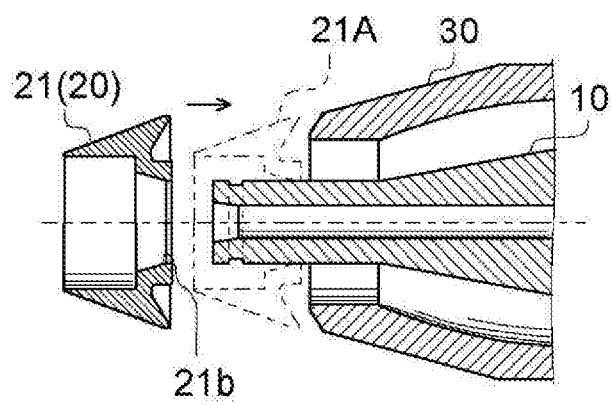
FIGS. 3A-3D sequentially illustrates assembling of the metal tip to a sleeve shaft.

Under this condition, the tip of the sleeve shaft 10 is inserted into the main body member 21 as shown in FIG. 3A.

At this time, the main body member 21 is temporarily arranged at a position (position represented by a metal tip 21A in FIG. 3A coaxial with the sleeve shaft 10 via the through-hole 21b, the position being out of a predetermined position to some degree to the upstream side.

In other words, the main body member 21 is arranged such that the through-hole 21b is located upstream (base side of the sleeve shaft 10) from the position on the sleeve shaft 10 at which the collar member 22 is to be fitted.

Figure 3B:
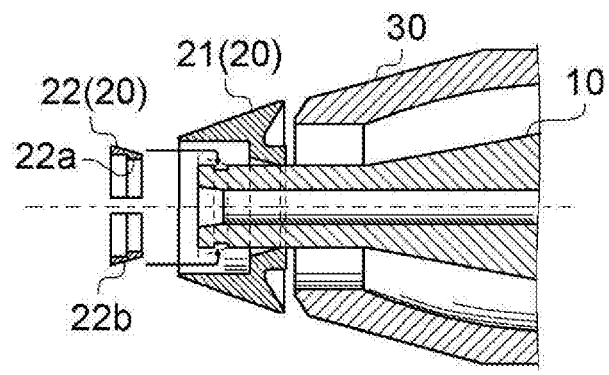

After the main body member 21 has once been arranged, the collar member 22 is fitted to the tip of the sleeve shaft 10 as shown in FIG. 3B.

Specifically, since the collar member 22 has the halved structure divided into two parts in the radial direction as described above, it is easy to fit the collar member 22 to the tip of the sleeve shaft 10 by clamping the tip between the two parts of the collar member 22.

Accordingly, movement of the collar member 22 along the axial direction is regulated using the projecting portion 22a, and the collar member 22 is fixed to the tip of the sleeve shaft 10 coaxially with the sleeve shaft 10 such that the outer circumferential surface 22b has a tapered shape the cross-sectional area of which gradually becomes smaller in diameter toward the upstream side.

Figure 3C:
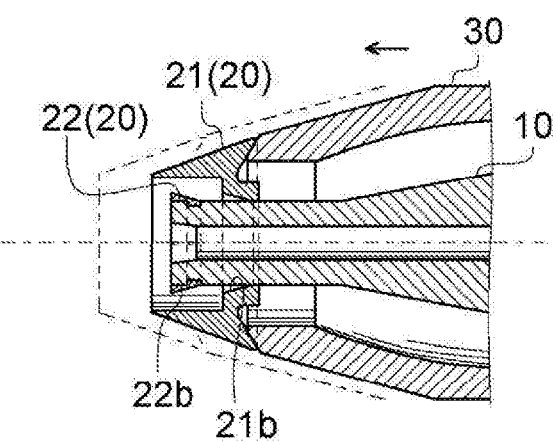

After the collar member 22 has been fitted, the main body member 21 is pushed toward the downstream side (tip side of the sleeve shaft 10) along the axial direction as shown in FIG. 3C. Specifically, by adjusting the position of the adjusting nut 53 (see FIG. 1) of the urging mechanism 50, the main body member 21 is urged toward the downstream side along the axial direction by the urging force of the urging mechanism 50 with the metal holding fixture 40 and the refractory tube 30 there between.

Accordingly, on the outer circumferential surface 22b of the collar member 22, the main body member 21 is fitted using the through-hole 21b.

Figure 3D:
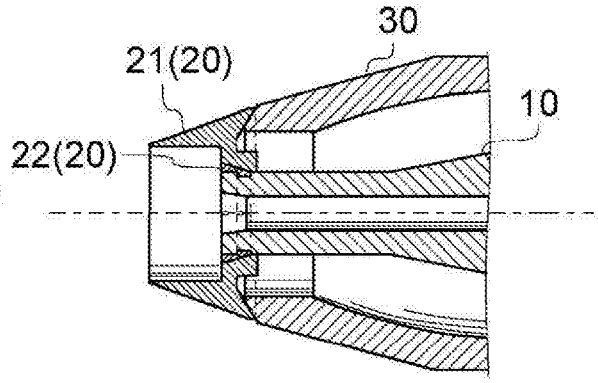

Hence, as shown in FIG. 3D, movement of the main body member 21 toward the downstream side along the axial direction is regulated at the tip of the sleeve shaft 10 with the collar member 22 there between, and the main body member 21 is held by the sleeve shaft 10.

In other words, the metal tip 20 is assembled to the tip of the sleeve shaft 10.

INDUSTRIAL APPLICABILITY

The sleeve for glass tube molding and the method for assembling a sleeve for glass tube molding according to the present invention can be used in a technique about a metal tip mounted on the downstream-side tip of a refractory tube that guides, toward the downstream side, molten glass wrapped around its outer circumferential surface in, for example, the Danner process.

REFERENCE SIGNS LIST 1 sleeve (sleeve for glass tube molding)
10 sleeve shaft
20 metal tip
21 main body member
21b through-hole
22 collar member
22b outer circumferential surface
30 refractory tube

The invention claimed is:
1. A sleeve for glass tube molding comprising:
  a sleeve shaft;
  a refractory tube into which the sleeve shaft is inserted in a coaxial manner; and
  a metal tip secured to a tip of the sleeve shaft and configured to regulate movement of the refractory tube in an axial direction and toward a tip side, the metal tip comprising:
    an annular collar member having a tapered outer circumferential surface of which a cross-sectional area increases in diameter toward the tip side and an inner surface consisting of a flat portion disposed at the tip of the sleeve shaft and an annular projecting portion extending from the flat portion and fitted into a depressed portion of the sleeve shaft, and being coaxially fitted to the tip of the sleeve shaft; and
    a main body member having a tapered through-hole of which a cross-sectional area increases in diameter toward the tip side so as to conform to the outer circumferential surface of the collar member, and being fitted to the collar member via the through-hole.

2. The sleeve for glass tube molding according to claim 1, wherein the collar member has a halved structure divided into two parts in a radial direction.

3. A method for assembling a sleeve for glass tube molding, the sleeve comprising:
  a sleeve shaft; and
  a metal tip secured to a tip of the sleeve shaft, the metal tip comprising:
    an annular collar member having a tapered outer circumferential surface of which a cross-sectional area increases in diameter toward a tip side, and being coaxially fitted to the tip of the sleeve shaft and an inner surface consisting of a flat portion disposed at the tip of the sleeve shaft and an annular projecting portion extending from the flat portion and fitted into a depressed portion of the sleeve shaft; and
    a main body member having a tapered through-hole of which a cross-sectional area increases in diameter toward the tip side so as to conform to the outer circumferential surface of the collar member, and being fitted to the collar member via the through-hole, the method comprising:
  inserting the sleeve shaft into the main body member such that the main body member is out of, to a base side, a position on the sleeve shaft at which the collar member is to be fitted;
  fitting the collar member to the tip of the sleeve shaft; and
  moving the main body member toward the tip side to fit the main body member to the collar member to assemble the metal tip to the tip of the sleeve shaft.

4. A method of manufacturing a glass tube, the method comprising:
  providing a sleeve for glass tube molding comprising:
    a sleeve shaft;
    a refractory tube into which the sleeve shaft is inserted in a coaxial manner; and
    a metal tip secured to a tip of the sleeve shaft and configured to regulate movement of the refractory tube in an axial direction and toward a tip side, the metal tip comprising:
      an annular collar member having a tapered outer circumferential surface of which a cross-sectional area increases in diameter toward the tip side, and being coaxially fitted to the tip of the sleeve shaft and an inner surface consisting of a flat portion disposed at the tip of the sleeve shaft and an annular projecting portion extending from the flat portion and fitted into a depressed portion of the sleeve shaft; and
      a main body member having a tapered through-hole of which a cross-sectional area increases in diameter toward the tip side so as to conform to the outer circumferential surface of the collar member, and being fitted to the collar member via the through-hole,
  supporting the sleeve for glass tube molding with a tip of the sleeve for glass tube molding inclining downward and drivingly rotating the sleeve for glass tube molding about an axis of the sleeve for glass tube molding; and
  causing a molten glass to flow down on the sleeve for glass tube molding,
  wherein the glass tube is shaped by letting molten glass flow on a sleeve that is wrapping the flowing molten glass around the outer circumferential surface, and drawing the molten glass from the tip of the sleeve.

* * * * *